Jan. 5, 1971   H. C. GEORGII   3,552,132
OIL TERMINAL AND METHOD FOR FABRICATING THE SAME
Filed Aug. 8, 1968   3 Sheets-Sheet 1

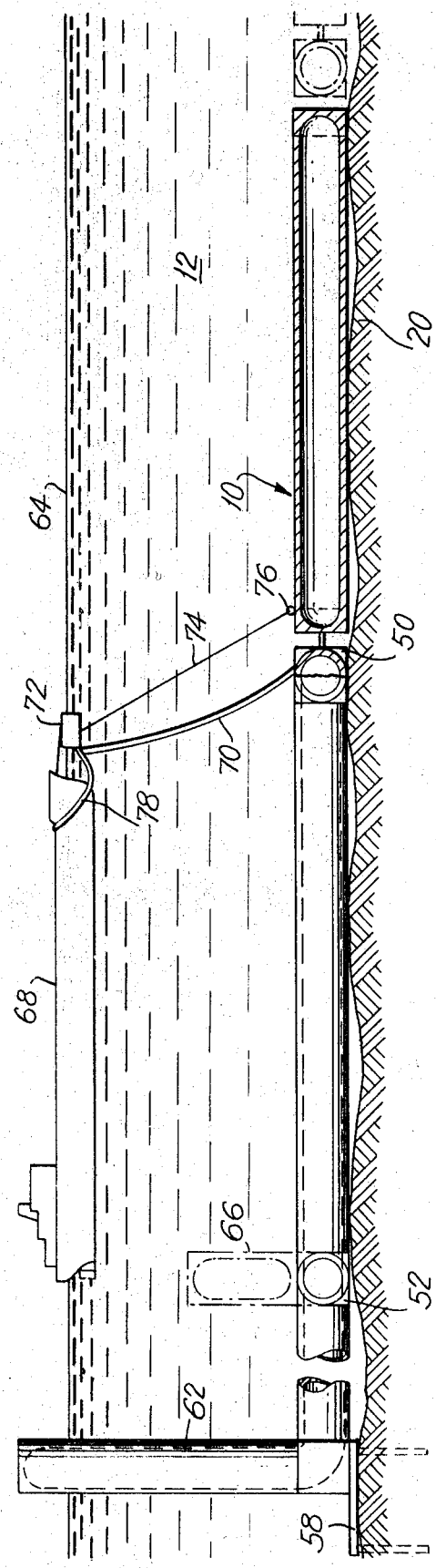
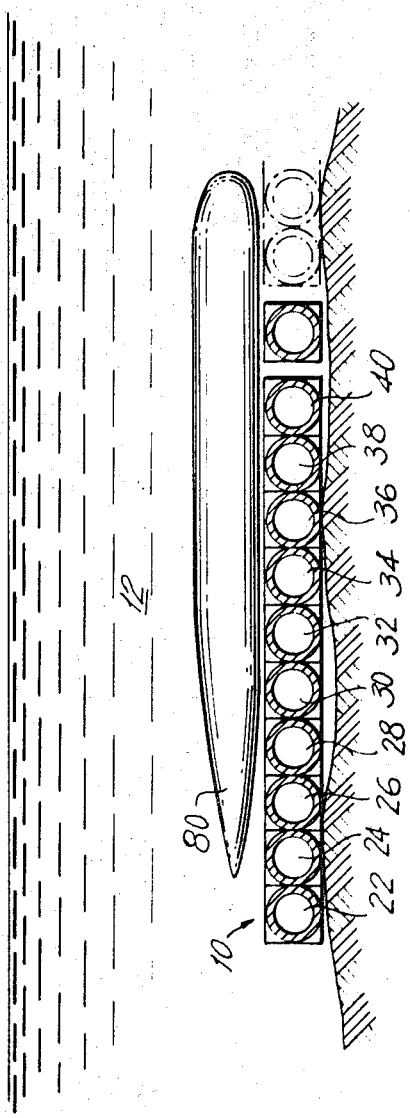

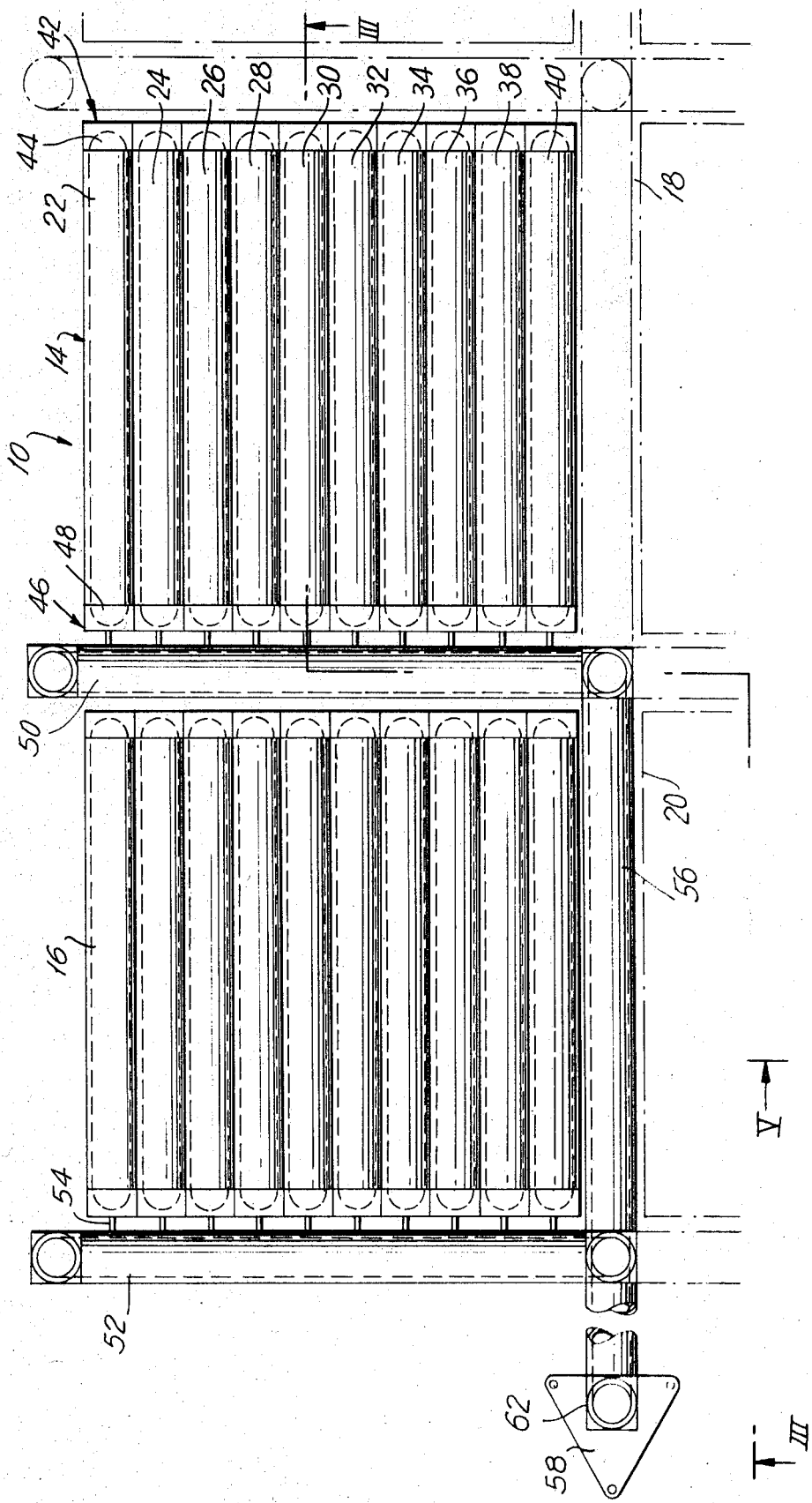

United States Patent Office 3,552,132
Patented Jan. 5, 1971

3,552,132
OIL TERMINAL AND METHOD FOR
FABRICATING THE SAME
Hans Christer Georgii, 42 Rindogatan,
Stockholm, Sweden
Filed Aug. 8, 1968, Ser. No. 751,112
Claims priority, application Sweden, Aug. 9, 1967,
11,318
Int. Cl. E02d 29/00
U.S. Cl. 61—46          9 Claims

ABSTRACT OF THE DISCLOSURE

A method of making an oil terminal is proposed, according to which a battery of concrete cylinders is cast in situ, whereafter the battery is sunk into position on the ocean floor to provide a storage depot for oil. Communication ducts and a control tower are connected to the battery for optimum utilization of the same. The oil can be removed by the use of surface vessels through the intermediary of a flexible hose. Alternatively, the oil can be removed by a submarine vessel. The battery of cylinders can be formed by a flotational process in which the cylinders as they are cast are gradually sunk below the surface of the water.

DRAWINGS

Figure 1:
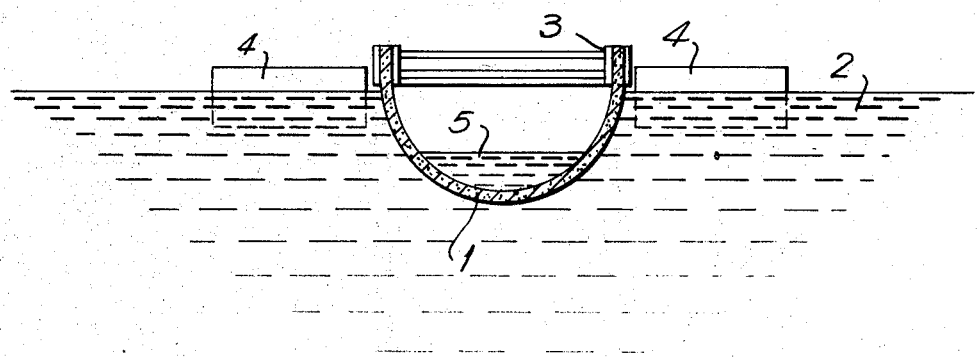
FIG. 1 is a diagrammatical cross-sectional view illustrating the formation of an element of a concrete battery in accordance with the invention.

FIG. 3 diagrammatically illustrates an oil terminal provided in accordance with the invention;

FIG. 4 diagrammatically illustrates in top plan view the oil terminal of FIG. 3; and FIG. 5 diagrammatically illustrates a cross-section of the terminal of FIG. 4 being serviced by a submarine vessel.

DETAILED DESCRIPTION

This invention relates to submarine oil storage terminals and to methods of making the same.

The methods are based on the method of the present invention disclosed in my earlier U.S. Pat. No. 3,249,664, which deals with manufacturing elongated hollow concrete bodies which, according to the present invention, are used for the construction of submarine oil storage terminals.

As will be shown, the terminal of the invention is entirely submerged in water. Only a tower rises above the surface of the water for loading, unloading, inspection, controlling, repairing and similar operations. The water depth may be, for example, 75–100 meters in correspondence with an original proposal for the English Channel. Such depth may vary substantially without departing from the scope of the invention. In any event, the storage terminal is submerged in the water in order to avoid weather forces and the like at and close to the surface of the sea.

The terminal of the invention generally comprises three different types of units: storage tanks or cylinders, communication ducts or tunnels and a control tower. All of these units are made of concrete and manufactured by the method disclosed in the above-mentioned patent.

Each storage unit consists of a plurality of concrete cylinders disposed side-by-side in parallel relationship and forming a "battery" of storage cylinders. The storage cylinders of each such battery are manufactured simultaneously from a common bottom piece forming one end of the cylinders of the battery and will consequently be connected to each other through this common bottom piece. When the casting of the cylinders of a battery is completed, the tops of the cylinders (which cylinders are cast in vertical position) are closed and connected to each other by a common top piece which is similar to the bottom piece. Thereby, the parallel storage cylinders of a cylinder battery are mutually connected to each other at both ends.

A battery may consist, for example, of 10 cylinders. However, the number of cylinders and the dimensions of each cylinder are adjusted to the dimensions of the desired total terminal capacity and water depth. The storage cylinders may be in direct communication with the communication tunnels or ducts. Alternatively, the ends of the storage cylinders may be connected to the communication ducts or tunnels by short communication pipes.

The communication ducts may also be pre-cast by means of the method described in the above-mentioned patent. These communication ducts serve as connection links between the storage cylinder batteries themselves and between these and the control tower or a terminal buoy. The communication ducts are used as pipelines and for inspection, repairing, etc. Directly or via a lock (depending on the pressure) it is furthermore possible to inspect the storage cylinders individually.

The control tower is either pre-cast by the method of the above-mentioned patent and floated to the site of the terminal or it can be cast "on site" with the storage cylinders and the communication ducts used as "a bottom piece." The control tower is a fairly slim construction and can take all kinds of punishment from weather forces. The tower is firmly connected at its bottom end to a communication duct and is able to take all bending moments.

Generally speaking from a static point of view, the oil terminal consists of an extremely rigid plate or platform lying on the ocean bottom with a tower rising above the surface.

The storage cylinders serve as enormous beams which are interconnected by their common bottom pieces and by the communication ducts. The common bottom pieces of the storage cylinders and the communication ducts form enormous beams extending in orthogonal direction. Together these units form a very rigid plate.

The control tower and the communication ducts are made for atmospheric pressure. Normally the storage cylinders are constructed only to keep the oil inside the cylinders, although it is quite possible to make the storage cylinders for atmospheric pressure. With my manufacturing method, it is possible to control the weight of the structure for each section of the terminal. By controlling the dead weight of the structure and trimming the storage cylinders with water when oil is pumped out of the cylinders it is possible to a very high degree to control the foundation forces of the structure.

The foundation of the terminal is normally no problem. The structure is rigid enough to account for all forms of irregular contours of the ground. It is kept in place by its own weight and the friction forces only. In case of atmospheric pressures in the storage cylinders the lifting tendency of empty storage cylinders can be neutralized by in situ moorings to rock. By using a storage cylinder, part of a communication duct or an exchange bell as a ballasting tank, it is possible to control the weight of the structure during operation.

At each crossing between the communication ducts, it is possible to connect an exchange bell or a tower. For large terminals to be used by submarine tankers as well as surface tankers, the tower is preferably located at a considerable distance from the storage cylinders for traffic safety. For small terminals to be used only by surface vessels, however, the control tower can be located on top of one of the communication ducts.

The terminal is put together in a floating position in that the various batteries of the storage cylinders are connected to the communication ducts. From the plate formed in this way, the control tower can be cast and the complete structure subsequently sunk to its final position on the bottom of the sea. During this operation the structure can be guided by two temporary exchange bells or towers.

Due to the layout and build-up of the terminal, it is possible to inspect and make repairs on the entire terminal (except for the storage cylinders in some cases) at atmospheric pressure. In this way, the pipelines for the oil, which pipelines are situated in the communication ducts, can be controlled over their entire length.

With the layout of the terminal used according to the invention it is possible to add new storage units both at the same level as well as at higher levels, by using units exactly identical with those of the original terminal.

The method used for making elongated hollow concrete bodies comprises the steps of fabricating first a comparatively short end section for the hollow concrete body, having one end closed and the opposite end open; placing the closed end section with its axis vertical and the open end facing upwards on the surface of a body of water so that the end section is floating substantially independently in the water with its upper edge above the surface of said water and its entire weight balanced by the upward thrust of the surrounding water; placing a form for the pouring of concrete along the upper edge of the end section; progressively fabricating the concrete body on top of the upper edge of said end section vertically upwards by pouring concrete in the form and progressively raising the form vertically upwards relative to the fabricated portion of the concrete body; and simultaneously filling water into the end section of and the fabricated portion of the concrete body so that said end section and said fabricated portion of the concrete body sink together vertically downwards in the surrounding water but are maintained substantially independently floating therein with the upper edge of said fabricated portion of said concrete body above the surface of the surrounding water and with the entire weight of said end section and said fabricated portion of the concrete body balanced by the upward thrust from the surrounding water.

The invention will next be explained in greater detail with reference to the drawing, the figures of which have been described hereinabove.

In the drawing FIG. 1 shows the first fabricated, closed bottom section 1 of the hollow concrete body to be fabricated. This bottom section may be fabricated on land and may consist of reinforced concrete for forming an integral part of the concrete body to be fabricated. Alternatively this bottom or end section may be constructed of steel or any other suitable material and be removable from the fabricated concrete body, when this is completed, and reusable for the fabrication of further concrete bodies. The bottom section 1 is placed floating with its open end facing upwards on the seurface of a free body of water 2, preferably having a depth exceeding the desired length of the concrete body to be fabricated. On the upper edge of this bottom section 1 a suitable form for the pouring of concrete, preferably a slip-form is placed. The form 3 is preferably substantially entirely supported from the floating bottom section 1. Lateral movement of the bottom section 1 is prevented by means of pontoons, floats, tanks or similar equipment 4, which also can serve as a platform for the pouring of concrete into the form 3. A certain amount of water 5 is filled into the bottom section 1 from the beginning of the operation so that the upper edge of the form 3 assumes a suitable position above the surface of the surrounding water 2.

Figure 2:
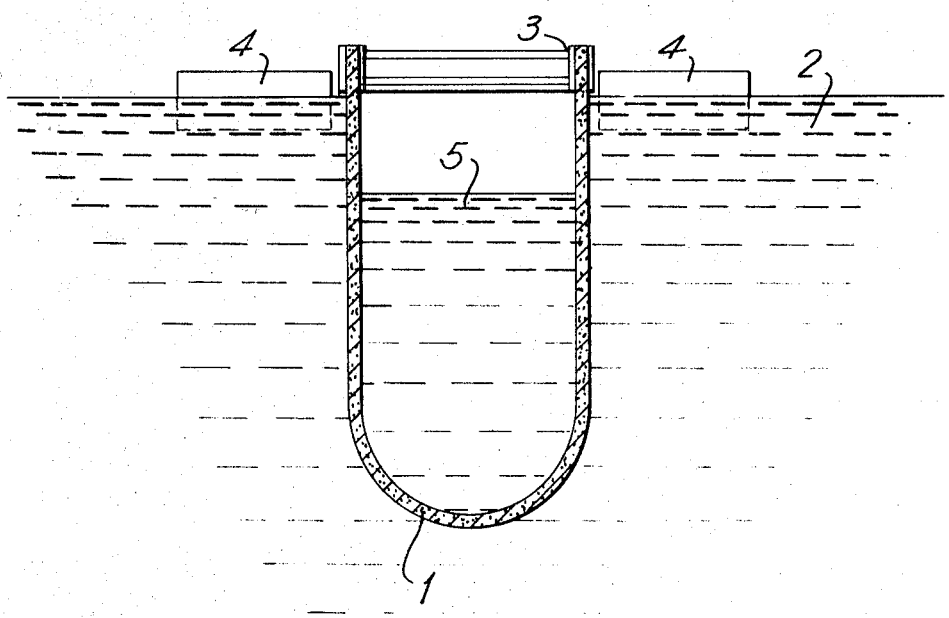
FIG. 2 is a cross-sectional diagrammatical view similar to that of FIG. 1, illustrating the procedure of forming a battery at a phase subsequent to that of FIG. 1.

Thereafter concrete is poured in the form 3 and the form is progressively raised as the poured concrete sets, in conventional manner. Simultaneously more water is filled into the already fabricated portion of the concrete body so that this sinks vertically downwards in the surrounding water while remaining substantially independently floating therein with the upper edge of the form 3 at the desired height above the surface of the surrounding water, as shown in FIG. 2, and with the entire weight of the bottom section 1 and the already fabricated portion of the concrete body balanced by the upward thrust from the surrounding water 2. When the concrete body has reached its desired length, the form 3 is removed and the upper end of the concrete body may be sealed by means of a bulkhead or by another end piece.

Thereafter the water 5 present in the concrete body can be drawn therefrom completely or partially so that the concrete body assumes a floating position in the water with its longitudinal axis horizontal. In this position the concrete body can be easily towed to the place where it is to be used.

In the method of the present invention a plurality of connected parallel cylinders are cast in a battery. For this purpose an end piece is provided having a plurality of concavities each corresponding to one of the cylinders of the battery and atop which the respective cylinders are cast. After the cylinders are thusly cast in the battery, the opposite ends thereof may be covered or obturated by an end piece corresponding to the first said end piece such that the battery is completed in the form of a plurality of parallel and connected cylinders closed at the opposite ends thereof.

This is further illustrated in FIGS. 3 and 4, wherein is shown a terminal 10 which has been sunk into position in a body of water 12 which may be a channel, a bay, a sea, a lake or the like.

As has been heretofore indicated a plurality of batteries may be employed. Thus, for example, there is illustrated in FIG. 3 and FIG. 4 a plurality of batteries 14, 16, 18 and 20 arranged in coplanar relationship and cooperatively constituting a plate or rigid platform which is supported on the bottom 20 of the body of water.

Considering batteries 14 and 16 by way of example, each of these is formed by a plurality of connected cylinders. In battery 14, for example, these are indicated at 22, 24, 26, 28, 30, 32, 34, 36, 38 and 40. Each of these cylinders is capped by a corresponding portion of an end piece 42 provided with a concavity 44 atop which the corresponding cylinder is initially cast. The opposite ends of the cylinders are obturated by an end piece 46 similarly provided with concavities 48 in correspondence with the associated cylinders.

There are provided for the batteries communication ducts such as ducts 50 and 52 which may be cast in a manner similar to the various cylinders. The ducts 50, 52 and the like may be in direct communication with the cylinders or may be coupled thereto by means of connecting pipes 54 which may be of metal or which similarly may be cast of concrete. The communication ducts are preferably arranged so as to be perpendicular to the cylinders which they service.

The communication ducts are coupled to a communication tunnel 56 extending laterally from the batteries which are serviced. The communication tunnel 56 extends outwardly towards a platform 58 sunk into the bottom 20 and held thereat by means of posts 60.

Extending upwardly from the platform 58 is a control tower 62 which has a height sufficient to extend above the surface 64 of the body of water in which the terminal has been located. The control tower 62 provides an access into the control tunnel 56 and communication ducts 50 and 52, so that access may be had to the latter for purposes of inspection, maintenance, utilization and so forth. The tower 62 is cast in the manner which has been indicated hereinabove.

At the intersections of the ducts and tunnels there may be provided exchange bells 66. These bells are cast in a manner similar to that employed for the cylinders of the batteries noted hereinabove and the technique employed for casting the tower 62. The exchange bells 66 are intended for access purposes and for the exchange of personnel, material, equipment and so forth.

As indicated in FIG. 3, the terminal may be serviced by a surface craft 68 through the intermediary of a flexible hose 70 coupled to the communication ducts such as the communication duct 50. The flexible hose 70 will be coupled to a buoy 72 held to one of the batteries by means of a cable 74 anchored as indicated at 76. The surface vessel 68 will be readily maneuvered to locate the buoy 72, whereupon the flexible end 78 of the hose 70 may be taken aboard and coupled to suitable tanks in the vessel 68 either for transmitting oil to the storage terminal or taking oil therefrom.

As a suitable alternative a submarine vessel 80 as illustrated in FIG. 5 may be employed to service the submarine oil depot.

It will now be understood that in accordance with the invention there is provided an under-water storage terminal comprising at least one battery including a plurality of connected storage cylinders adapted for under-water location, there being further provided means to communicate with these cylinders. The battery is preferably a one-piece structure of a concrete-like material and is in the form of a plate or platform which in turn is a rigid structure supported on the surface of the body of water in which the terminal is located.

The cylinders are arranged in parallel and include aligned ends covered by suitable end pieces, there being further provided a concrete communication duct extending along these ends with pipes or the like connecting the cylinders with such duct.

A concrete tower may be connected with the aforenoted duct or ducts and such tower will extend above the water in which the battery is located.

The arrangement may be serviced by a surface vessel through the intermediary of a hose coupled to the duct and located by a buoy which is connected to the underwater terminal to locate the same. Alternatively the arrangement may be serviced by a submarine vessel.

A plurality of batteries may be employed which will preferably be arranged in coplanar relationship, in which event the ducts preferably extend between and perpendicular to the batteries.

The terminal may rest loosely on the floor of the body of water in which the terminal is located depending on the weight of the battery and ballasting of the same, but as a suitable alternative the terminal may be physically anchored to the sea bottom on which it is located.

The arrangement may be provided with exchange bells, towers and the like or other means to communicate with the cylinders, such means being preferably connected to intersections of the various communication ducts and tunnels servicing the batteries.

Preferably the oil terminal of the invention is fabricated immediately above the position whereat it is to be ultimately located, after which fabrication the oil terminal is sunk to its ultimate position of rest. As an alternative, the terminal can be fabricated at a plant remote from its ultimate site and may be floated to a position above such site and thereafter sunk.

The invention according to one embodiment thereof is characterized by the terminals being cast out of concrete or other such material having the necessary properties to withstand prolonged immersion in a body of water.

There will now be obvious to those skilled in the art many modifications and variations of the structure and techniques set forth hereinabove. These modifications and variations will not depart from the scope of the invention if defined by the following claims.

What is claimed is:

1. Apparatus for underwater storage of fluids comprising at least one planar, slab-shaped structure of concrete including longitudinally opposite edge portions and provided with a plurality of adjacent, parallel, and separate, longitudinally extending storage spaces having respective opposite open ends and otherwise being sealed, and covering means communicating collectively with each of said storage spaces connnected to said longitudinally opposite edge portions for closing said respective opposite open ends of said storage spaces, and for channeling fluid into and out of each of said storage spaces, said covering means being a single body, said slab-shaped structure being adapted for resting in a substantially horizontal attitude at the bottom of a body of water.

2. Apparatus as claimed in claim 1 wherein said slab-shaped structure is anchored in a fixed position at the bottom of the body of water by its weight.

3. Apparatus as claimed in claim 1 wherein said covering means include a concrete duct extending along and parallel to one edge portion of said slab-shaped structure and transversely communicating with each of said storage spaces.

4. Apparatus as claimed in claim 3 wherein said duct is integral with said slab-shaped structure.

5. Apparatus as claimed in claim 3, including a plurality of pipes and wherein said duct is connected to said slab-shaped structure through the intermediary of said pipes, one pipe communicating with one of each of said storage spaces.

6. Apparatus as claimed in claim 3, comprising a substantially vertical hollow concrete tower including a lower end communicating with the said duct and an upper end extending above the surface of said body of water.

7. Apparatus as claimed in claim 3, comprising a plurality of such concrete structures each including an associated said duct, said plurality of concrete structures being arranged in a coplanar chequer-work pattern on the bottom of the body of water with said ducts extending between adjacent structures, and further concrete ducts extending between said slab-shaped structures parallel to the longitudinally extending storage spaces in said slab-shaped structures and interconnecting said associated ducts.

8. Apparatus as claimed in claim 7, comprising a substantially vertical hollow concrete tower including a lower end rigidly connected to and communicating with one of said further ducts and including an upper end extending above the surface of the body of water.

9. Apparatus as claimed in claim 8 wherein said tower is located at an intersection between each said associated ducts and said further ducts.

References Cited

UNITED STATES PATENTS

| | | | |
|---|---|---|---|
| 3,097,493 | 7/1963 | Blankevoort | 61—46X |
| 3,113,699 | 12/1963 | Crawford et al. | 61—46.5X |
| 3,249,664 | 5/1966 | Georgii | 61—46X |
| 3,388,556 | 6/1968 | Manning | 61—46.5 |

J. KARL BELL, Primary Examiner